United States Patent [19]

Campau

[11] Patent Number: 5,090,442
[45] Date of Patent: Feb. 25, 1992

[54] FIELD REPAIRABLE APPARATUS FOR USE IN FILLING CONTAINERS TO A PREDETERMINED LEVEL

[75] Inventor: Daniel N. Campau, Grand Rapids, Mich.

[73] Assignee: Flow-Rite Controls, Ltd., Grand Rapids, Mich.

[21] Appl. No.: 748,680

[22] Filed: Aug. 22, 1991

Related U.S. Application Data

[63] Continuation-in-part of Ser. No. 554,293, Jul. 7, 1990, Pat. No. 5,048,557.

[51] Int. Cl.⁵ ............... F16K 21/18; F16K 43/00
[52] U.S. Cl. ................... 137/315; 137/260; 137/393; 137/414; 137/454.2; 137/805; 141/198; 429/64
[58] Field of Search ............ 137/256, 259, 260, 261, 137/315, 386, 393, 414, 454.2, 454.5, 454.6, 805; 141/198; 73/290 R; 429/64, 76, 91

[56] References Cited

U.S. PATENT DOCUMENTS

| | | | |
|---|---|---|---|
| 712,929 | 11/1902 | Hedstrom | 137/454.2 |
| 4,181,143 | 1/1980 | Fallon | 137/322 |
| 4,211,249 | 7/1980 | Richards | 137/393 |
| 4,292,996 | 10/1981 | Pataki et al. | 137/393 |
| 4,331,175 | 5/1982 | Brake | 137/322 |
| 4,515,178 | 5/1985 | Campau | 137/393 |
| 4,527,593 | 7/1985 | Campau | 137/393 |
| 4,790,349 | 12/1988 | Harris | 137/393 |
| 4,945,944 | 8/1990 | Chen | 137/414 |
| 4,961,444 | 10/1990 | Morgan et al. | 137/315 |

Primary Examiner—George L. Walton
Attorney, Agent, or Firm—Niro, Scavone, Haller & Niro

[57] ABSTRACT

An apparatus is disclosed for filling a container to a predetermined level with liquid provided from an external liquid supply means. The apparatus includes a main valve and a main valve seat for controlling the supply of liquid to the container. A lower valve housing is provided for supporting the main valve and main valve seat. An upper cap housing is also provided which is in fluid communication between the external liquid supply means and the main valve. Together, the lower and upper housings form a manually releasably connected valve assembly which is removably insertable into the container.

18 Claims, 3 Drawing Sheets

FIELD REPAIRABLE APPARATUS FOR USE IN FILLING CONTAINERS TO A PREDETERMINED LEVEL

This is a continuation-in-part of copending application Ser. No. 07/554293 filed on July 17, 1990, now U.S. Pat. No. , 5,048,557.

BACKGROUND OF THE INVENTION

U.S. Pat. No. 4,527,593, as well as co-pending U.S. Ser. No. 07/554,293, now allowed as U.S. Pat. No. 5,048,557, , are hereby incorporated by reference into this disclosure.

The present invention relates generally to a field repairable apparatus, including a main valve and main valve seat, for use in filling containers to a predetermined level.

One of the applications for the inventions disclosed in U.S. Pat. No. 4,527,593 and co-pending Ser. No. 07/554,293 has been for use as a battery refill valve. Accordingly, one of the purposes of those inventions, as used with that particular application, is to reduce battery maintenance costs through the automatic filling of batteries connected thereto with liquid to predetermined levels. However, some maintenance is still required. Occasionally, for example, a battery-mounted watering system may experience damage during battery handling operations. Damage may also be caused to the working components by contamination entering the valves from the refill water supply, or from debris on the top of the battery entering through the quick disconnect fitting.

Periodic inspection of each cell is desire able to identify a faulty refill valve before it causes cell damage. Presently, this requires replacement of the entire valve, since the valve is permanently assembled. Such prior art valves employ a strong welded joint between the cap and body to accommodate the operating pressure and to maintain a precise fit between parts so that the valve performs properly and closes with a drip-tight seal over a long operating life, and under widely varying conditions of chemical and temperature exposure. A shift of just a few thousandths of an inch between critical parts, for example, can cause this prior art valve to malfunction.

Co-pending Ser. No. 07/554,293 discloses design improvements which simplify assembly procedures and improve valve reliability. These improvements have significantly increased valve service life by enabling the valve to resist the build-up of internal deposits, one of the more common causes of early valve failure. These design changes, however, still require a precise alignment of parts and a strong weld to retain the cap and body. Additionally, the maintenance cost of replacing a faulty valve remains the same, since the entire cap and body must be replaced as a unit.

The most significant maintenance costs presently occurring with valves of the type discussed above are due to valve damage repair as a consequence of battery handling. This damage generally affects only the exterior parts of the valve, and is likely to occur either to the cap assembly, or to the body assembly, but rarely to both at the same time. For example, the valve design disclosed in U.S. Pat. No. 4,527,593 has the advantage that the critical valve components are mounted in a body assembly below the battery cover plate, and thereby protected from handling damage. Thus, the components exposed to possible handling damage reside in the cap assembly, and are not affected by the factors which could damage critical valve components. In virtually any failure mode that can occur with such valve and cap assemblies, only one part of the refill valve, either the valve assembly or the cap assembly, need be replaced at a time. The natural repair interface is therefore at the cap/body joint.

Leakage has been the most significant cause for rejection during the manufacturing process. The occurrence of leakage is high because the valve housing, valve seat, and cap of the inventions referred to above are independent parts which are pressed together. The valve housing and cap are then seam welded together by a hand-held iron. The chance for misaligned parts is high.

However, as can be understood from the foregoing, refill valve assemblies not designed in accordance with the general design disclosed in U.S. Pat. No. 4,527,593, and having the valve components located above the battery cover, are exposed to handling damage as well as contamination factors. For this reason, even minor damage to these valves requires complete valve replacement.

Maintenance costs would therefore be minimized if the body, which contains all of the critical valve components, could be preserved if the cap were damaged. Conversely, if only the body were damaged, the cap and swivel connector could be preserved. However, in order to achieve a maintenance cost reduction, the replacement procedure would have to be able to be quickly, reliably and manually performed by unskilled workers, without the use of special tools. These workers would have to able to determine the problem readily and replace the damaged part.

Field personnel would be readily able to diagnose the faulty component with such an apparatus. For example, if a battery cell were over-filled or under-filled, then it would quickly be realized that the valve components are damaged. If there were visible damage to the cap assembly, or obvious leakage on the top of a battery, then the cap components would have to be replaced.

SUMMARY OF THE INVENTION

Accordingly, one of the objects of the present invention is to provide an apparatus for use in filling containers to a predetermined level which is quickly, reliably, and manually field repairable.

Another object of the present invention is to provide an apparatus having a cap and a valve body, in which either the cap or the valve body is easily removed and replaced, without the need for replacing the entire apparatus.

An additional object of the present invention is to provide an apparatus in which a damaged valve body could be replaced with a similar non-damaged valve body, which would interchangeably fit with various cap assembly styles.

A further object of the present invention is to provide an apparatus which minimizes inventory and manufacturing costs, decreases production costs, and which simplifies service tasks.

A still further object of the present invention is to provide an apparatus which preserves the advantages disclosed in U.S. Pat. No. 4,527,593 and Ser. No. 07/554,293, including the location of valve components below a suitable cover, such as a battery cover, and the increase of valve service life by enabling the valve to resist the build-up of internal deposits.

Yet another object of the present invention is to provide an apparatus which significantly improves the production yield by virtually eliminating rejections made during manufacturing due to leakage.

These objects are achieved by the present invention, which is directed to solving the problems referred to above, while maintaining the advantages disclosed in U.S. Pat. No. 4,527,593 and co-pending Ser. No. 07/554,293. Accordingly, an apparatus is provided for filling a container to a predetermined level with liquid provided from an external liquid supply means. The apparatus includes a main valve and a main valve seat for controlling the supply of liquid to the container, and an upper cap housing and lower valve housing. The lower valve housing supports the main valve and main valve seat. The upper cap housing is in fluid communication between the external liquid supply means and the main valve. The lower and upper housings together form a manually releasably connected valve assembly which is removably insertable into the container.

In a preferred embodiment, the lower valve housing includes a manually actuable tab configured and positioned to engage a recess in the upper cap housing. When the tab engages the recess, the lower and upper housings are maintained in assembled relation, and are configured to provide tactile feedback to an operator sufficient to allow connection of the housings in the absence of visual verification. Also, the lower valve housing and main valve seat are connected such that substantially all of the operating pressure reactive forces which are applied to the main valve seat are concentrated at the housing-seat connection.

In another preferred embodiment, a passageway is provided which is in fluid communication with the main valve and main valve seat, such that any residual liquid flows away from the main valve seat after the main valve has been placed in an open position. A drain can also be provided above, and in fluid communication with the passageway. This embodiment also preferably includes fluid amplifier means for receiving a portion of the liquid flowing through the main valve means and thereby generating a pressure signal only until the container is filled. Pilot valve means are also provided for maintaining the main valve means open in the presence of the pressure signal, and for closing the main valve means in the absence of the pressure signal.

In still another preferred embodiment, the valve apparatus disclosed in U.S. Ser. No. 07/554,293 is used, in which the apparatus is normally open and closes only upon the application of supply liquid pressure together with the filling of the container to the predetermined level. The main valve means includes a main valve support for supporting the main valve to prevent substantial deflection of the main valve away from the seat when liquid pressure from the supply means is applied to the apparatus. The main valve is maintained a predetermined distance from the seat when liquid pressure from the supply means is released from the apparatus, and a portion of the main valve support is disposed within the main valve to engage the interior periphery of the main valve and to limit the amount of deflection of the main valve in a direction away from the main valve seat. A lower portion of the valve support extends exteriorally of the main valve to provide a substantially circumferential support about a lower external periphery of the main valve for limiting peripheral deflection of the main valve.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Figure 1:
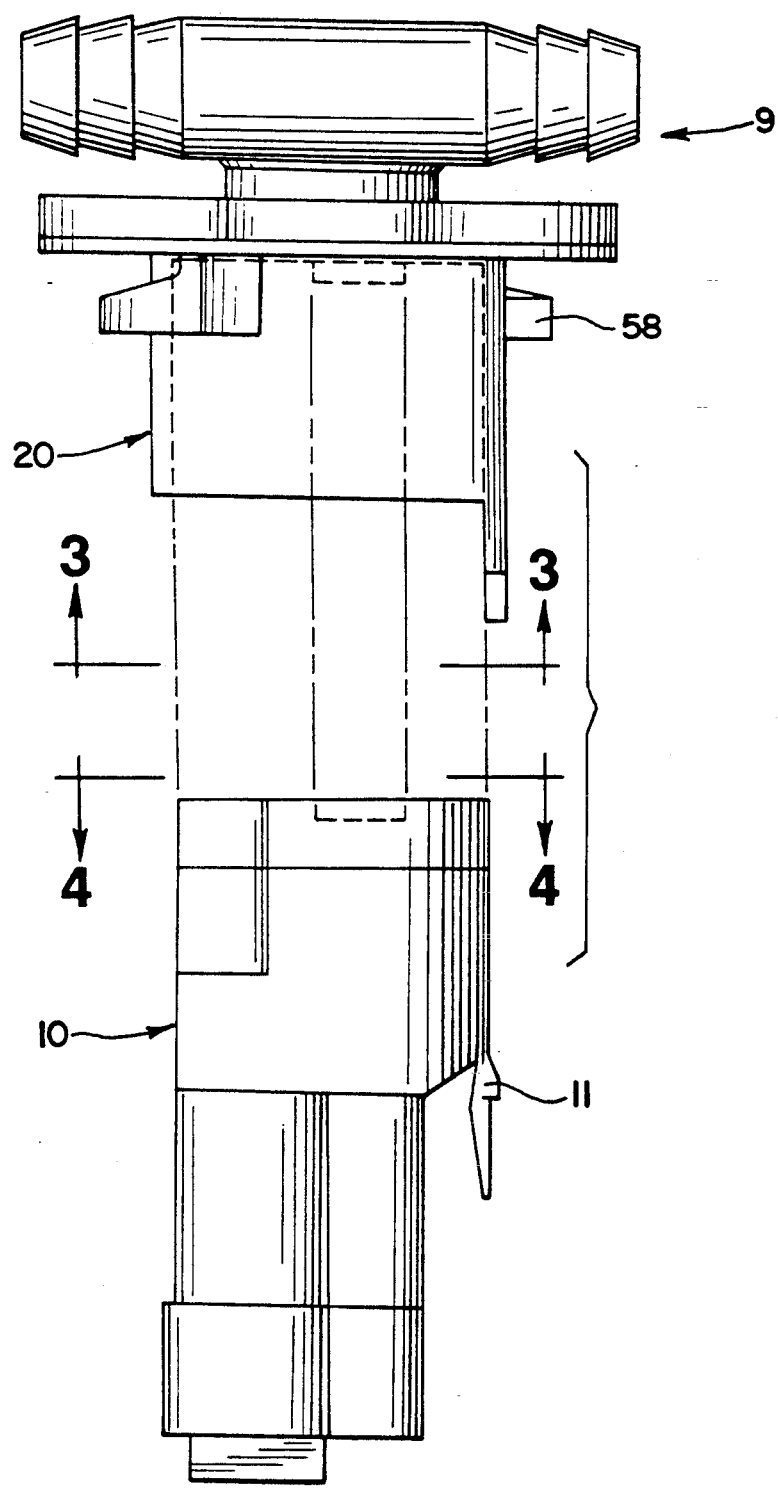
FIG. 1 is an exploded side elevational view of the apparatus of the present invention, illustrating the connection of the upper cap housing and lower valve housing.
Figure 2:
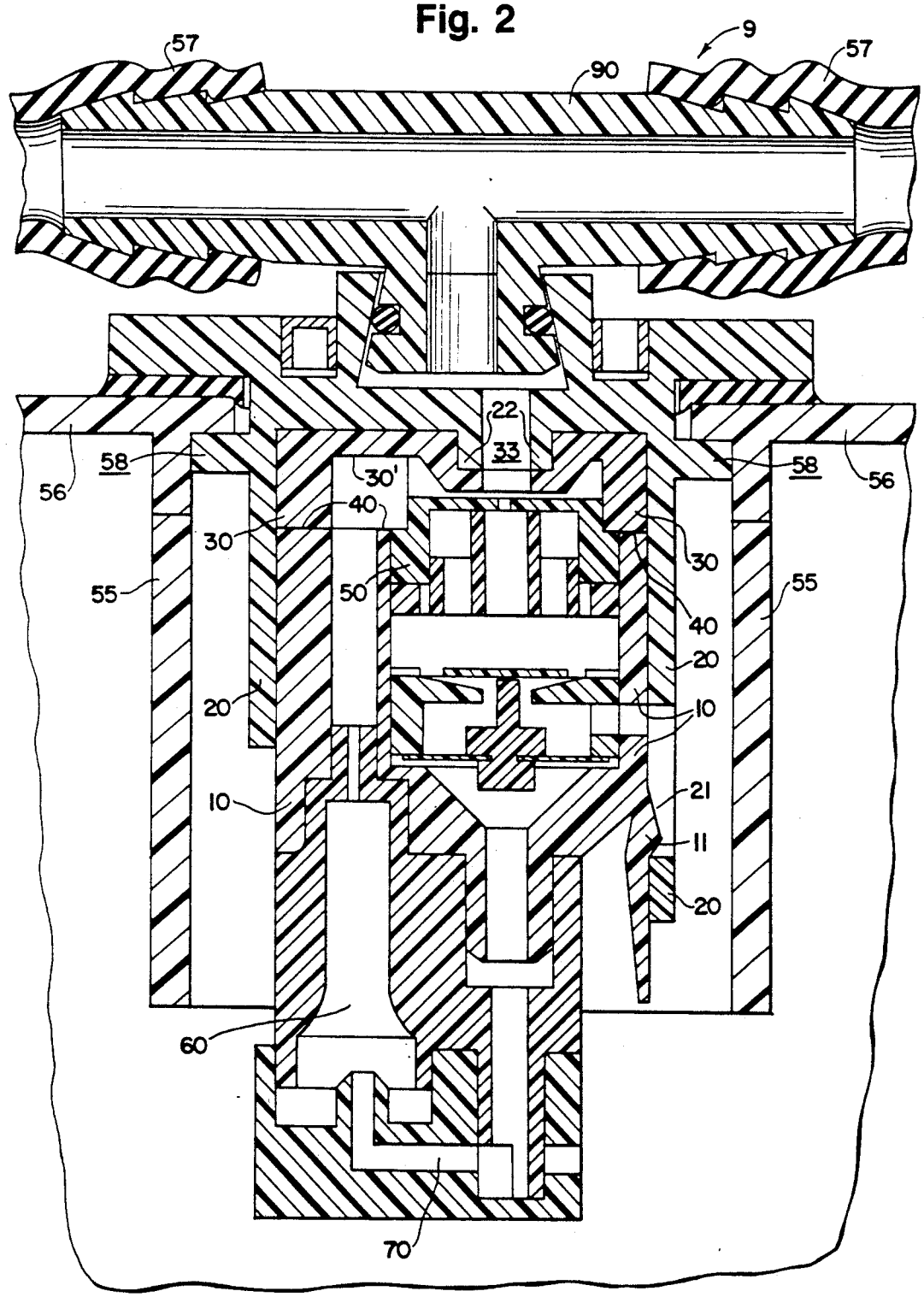
FIG. 2 is an enlarged side cross-sectional view of the upper cap housing, together with its swivel connector and connected supply lines, and the lower valve housing, together with the battery and battery cover connected thereto.

The apparatus of the present invention will not be described in detail with reference to the preferred embodiment disclosed in the drawings. Referring first to FIG. 1, an apparatus, generally designated 9, is provided for filling a container to a predetermined level, and includes a lower valve housing 10, an upper cap housing 20, and a swivel connector 90. The swivel connector 90 allows the apparatus to maintain fluid communication between an external supply means and a container. Referring now to FIG. 2, supply lines 57 enable fluid communication between swivel connector 90 and battery cover 56, and thus battery 55 (connection to battery 55 not shown). Bayonet threads 58 on upper cap housing 20 cooperate with a corresponding recess within battery cover 56, allowing the connection of valve apparatus 9 to battery 55.

Referring again to FIG. 2, the lower valve housing 10 and upper cap housing 20 will be more particularly described. The lower valve housing includes snap tab 11, which releasably engages a recess 21 within upper cap housing 20. The upper portion of lower valve housing 10 is formed by main valve seat 30, which is rigidly connected to the upper peripheral portions of the lower valve housing 10, preferably by ultrasonic welding techniques, to form a leak-tight seal which securely holds the valve components in position. The joints which are ultrasonic welded are indicated by thickened lines 40. The main valve seat 30 includes a weld area adjacent to the upper periphery of lower valve housing 10 sufficient to withstand the operating pressures acting on the lower surface 30' of seat 30. Finally, a boss 22 on upper cap housing 20 is insertable into a corresponding recess 33 within main valve seat 30 on valve housing 10, ensuring a sure and snap-fit connection, and a leak-tight joint. The boss 22 fits within recess 33 on the valve seat with a light press fit that assures a sealing connection while allowing the valve housing to be easily assembled and disassembled thereto.

Due to the rigid connection between lower valve housing 10 and main valve seat 30 at ultrasonic welds 40, the valve operating pressure only acts over the smaller boss 22 diameter. Therefore, the operating pressure acting to separate upper cap housing 20 from lower valve housing 10 is applied only between boss 22 and recess 33 on valve seat 30. Since the valve operating pressure remains constant but acts over a smaller area, the force acting to separate valve housing 10 from cap housing 20 is relatively small and can be overcome by the simple tab and accommodating recess arrangement described above.

In contrast, prior art valves include a main valve seat which is not rigidly connected to the abutting upper peripheral portions of the lower valve housing. Rather, the upper cap assembly is welded to the lower valve housing such that the valve operating pressure acts over the full diameter of the valve housing. Thus, the welds in prior art valves react the full pressure load between the valve seat and the lower valve housing.

With the valve of the present invention, field replacement is easily accomplished. Tab 11 is simply depressed from recess 21 and valve housing 10, which acts as the male plug and contains the valve components, is pulled out from cap housing 20, which acts as the female receptacle. The new component and the old, non-damaged component are then snapped back together.

The housings are configured to give tactile feedback to an operator and thus ensure proper connection when, for example, the operator cannot see the cooperating housings. Accordingly, referring now to FIGS. 3 and 4, upper cap housing 20 includes a recessed portion 25, a recessed plug-shaped portion 25A, and protruding portions 26; lower valve housing 10 includes a protruding portion 15, a protruding plug-shaped portion 15A and recessed portions 16. The operator need merely fit the plug-shaped portion 15A of lower valve housing 10 into the accommodating recessed plug-shaped portion 25A of upper cap housing 20. Once this is accomplished, recess 33 within main valve seat 30 on lower valve housing 10 will mate with boss 22 on upper cap housing 20.

In addition to rapid, manual field repair, the apparatus of the present invention, and specifically the preferred embodiment of the field repairable battery valve, offers several additional advantages. One advantage is that the valve body assembly or cartridge contained by lower valve housing can be used interchangeably with various styles of cap assemblies. This minimizes the cost of inventory and simplifies the service task.

A further advantage is that the ultrasonic welding of valve seat 30 to valve housing 10 significantly improves the precision, accuracy and alignment of critical valve components. This, in turn, improves the production yield by decreasing the rejections occurring during manufacturing due to leakage. Since the valve seat 30 is now machine welded to the valve housing 10, alignment of critical parts such as the main valve 50, main valve seat 30 and cap boss 22 is now consistent and precise. Further, this design reduces manufacturing costs and increases production rates, since the labor intensive job of welding the cap assembly to the valve assembly is now eliminated.

Those skilled in the art will understand that the present invention is readily adaptable to the improvements disclosed by Ser. No. 07/554,293. For example, a passageway and drain can be provided within the valve housing to allow liquid residue to drain from the main valve seat. Also, the valve apparatus and main valve supports disclosed in Ser. No. 07/554,293, and shown in the drawings of that patent, can be provided as well. Still further, the fluid amplifier means 60 and pilot valve means 70, disclosed by U.S. Pat. No. 4,527,593 and shown in FIG. 2, are readily adaptable to this invention.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. An apparatus for filling a container to a predetermined level with a liquid provided from an external liquid supply means, the apparatus including a main valve and main valve seat for controlling the supply of liquid to the container, comprising:
    a lower valve housing supporting said main valve and said main valve seat;
    an upper cap housing providing fluid communication between the external liquid supply means and the main valve;
    said lower and upper housings being joined together by a manual releasable connection forming a unified valve assembly which is removably insertable into said container;
    said main valve seat being joined to said lower valve housing by a fixed connection such that the operating pressure of said main valve acting to separate the upper and lower housings is confined to act over a relatively small area of the interior surface of said upper cap housing, and said fixed connection having sufficient strength to substantially withstand the force generated by said operating pressure action on said main valve, thereby minimizing the force acting to separate the upper and lower housings at said manual releasable connection.

2. The apparatus of claim 1 for filling a container to a predetermined level, wherein said lower valve housing includes a manually actuable tab configured and positioned to engage a recess in said upper cap housing, whereby said lower and upper housings are maintained in assembled relation when said tab engages said recess.

3. The apparatus of claim 1 for filling a container to a predetermined level, wherein said housings provide tactile feedback to an operator sufficient to allow connection of said housings by said operator in the absence of visual verification.

4. The apparatus of claim 1 for filling a container to a predetermined level, further comprising a passageway in fluid communication with the main valve and the main valve seat, said passageway being oriented to permit the flow of residual liquid to flow away from the main valve seat after the main valve has been placed in a open position.

5. The apparatus of claim 4 for filling a container to a predetermined level, wherein the main valve, the main valve seat and said passageway are oriented to permit residual liquid to flow through said passageway solely under the influence of gravity.

6. The apparatus of claim 4 for filling a container with a liquid to a predetermined level, further comprising a drain in fluid communication with said passageway to allow the flow of liquid from said passageway into the container, wherein the main valve seat is disposed above the main valve, and said passageway is disposed above said drain.

7. The apparatus of claim 1 for filling a container with a liquid to a predetermined level, further comprising:

fluid amplifier means for receiving at least a portion of the liquid flowing through said main valve means and thereby generating a pressure signal only until the liquid within said container reaches the predetermined level;

and pilot valve means for maintaining the main valve means open in the presence of said pressure signal and for closing said main valve means in the absence of said pressure signal.

8. An apparatus for filling a container to a predetermined level with a liquid provided from an external liquid supply means, in which the apparatus is normally open and closes only upon the application of supply liquid pressure together with the filling of the container to the predetermined level, the apparatus having main valve means for controlling the supply of liquid to the container, the main valve means including a flexible main valve, a main valve seat, and a main valve support for supporting the main valve to prevent substantial deflection of the main valve away from the seat when liquid pressure from the supply means is applied to the apparatus, the main valve being maintained a predetermined distance from the seat when liquid pressure from the supply means is released from the apparatus, a portion of the main valve support being disposed within the main valve for engaging the interior periphery of the main valve and for limiting the amount of deflection of the main valve in a direction away from the main valve seat, a lower portion of the valve support extending exteriorally of the main valve to provide a substantially circumferential support about a lower external periphery of the main valve for limiting peripheral deflection of the main valve, comprising:

a lower valve housing supporting said main valve and said main valve seat;

an upper cap housing to provide fluid communication between the external liquid supply means and the main valve;

said lower and upper housings together forming a manually releasably connected valve assembly which is removably insertable into said container.

9. The apparatus of claim 8 for filling a container to a predetermined level, wherein said lower valve housing includes a manually actuable tab configured and positioned to engage a recess in said upper cap housing, whereby said lower and upper housings are maintained in assembled relation when said tab engages said recess.

10. The apparatus of claim 8 for filling a container to a predetermined level, wherein said lower valve housing and said main valve seat are connected such that substantially all of the reactive forces applied to said main valve seat due to the operating pressure of said main valve are concentrated at said connection.

11. The apparatus of claim 8 for filling a container to a predetermined level, wherein said flexible main valve is an integrally molded, unitary element including a raised seat-engaging area and sidewalls carrying said raised area, said main valve being mounted in a press fit relationship with said main valve support.

12. The apparatus of claim 8 for filling a container to a predetermined level, wherein said main valve support includes means for supporting the raised seat-engaging area and the sidewalls of said main valve in the vertical direction, and means for supporting the sidewalls of said main valve in the horizontal direction.

13. The apparatus of claim 12 for filling a container to a predetermined level, wherein said main valve supporting means includes lower, upper and intermediate members, each of which is generally vertical and rigid, said upper member extending to abut the underside of said raised seat-engaging area of said main valve, said intermediate member extending to engage the inside of said sidewalls of said main valve, and said lower member extending to abut the underside of said sidewalls.

14. The apparatus of claim 12 for filling a container to a predetermined level, wherein said main valve supporting means includes three rigidly interconnected concentric cylinders each having a different length, the longest cylinder abutting the underside of said raised seat-engaging area of said main valve, the intermediate length cylinder abutting the inside of said sidewalls of said main valve, and the shortest cylinder abutting the underside of said sidewalls of said main valve.

15. The apparatus of claim 8 for filling a container to a predetermined level, further comprising a passageway in fluid communication with the flexible main valve and the main valve seat, said passageway being oriented to permit the flow of residual liquid to flow away from the valve seat after the main valve has been placed in an open position.

16. The apparatus of claim 15 for filling a container with a liquid to a predetermined level, further comprising a drain in fluid communication with said passageway to allow the flow of liquid from said passageway into the container, wherein the main valve seat is disposed above the main valve, and said passageway is disposed above said drain.

17. The apparatus of claim 15 for filling a container to a predetermined level, wherein the main valve, the main valve seat and said passageway are oriented to permit residual liquid to flow through said passageway solely under the influence of gravity after the valve is in an open position.

18. The apparatus of claim 8 for filling a container to a predetermined level, further comprising:

fluid amplifier means for receiving at least a portion of the liquid flowing through said main valve means and thereby generating a pressure signal only until the liquid within said container reaches the predetermined level;

and pilot valve means for maintaining the main valve means open in the presence of said pressure signal and for closing said main valve means in the absence of said pressure signal.

* * * * *

UNITED STATES PATENT AND TRADEMARK OFFICE
CERTIFICATE OF CORRECTION

PATENT NO. : 5,090,442

DATED : February 25, 1992

INVENTOR(S) : Daniel N. Campau

Figure 3:
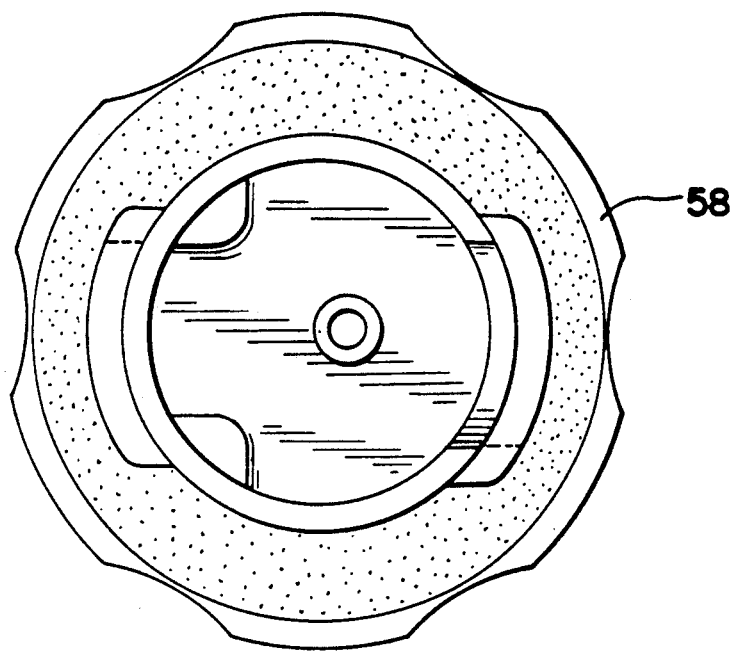
FIG. 3 is a plan view taken along line 3—3 of FIG. 1.
Figure 4:
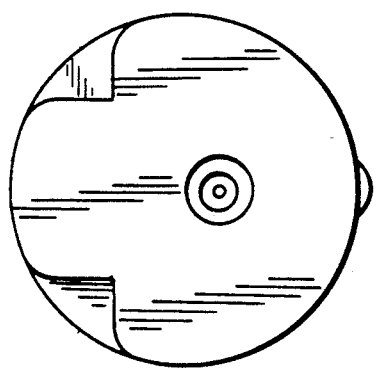
FIG. 4 is a plan view taken along line 4—4 of FIG. 1.
Figure 3:
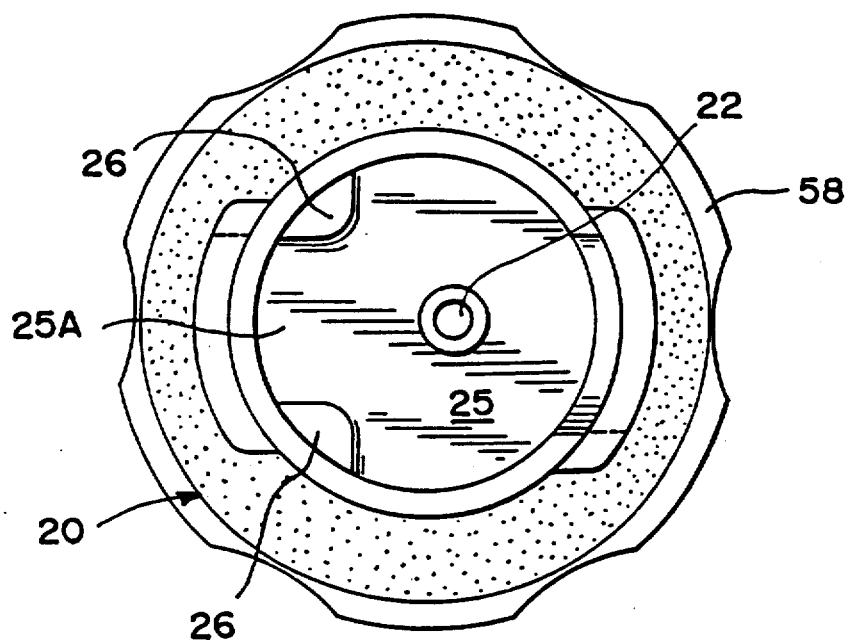
Figure 4:
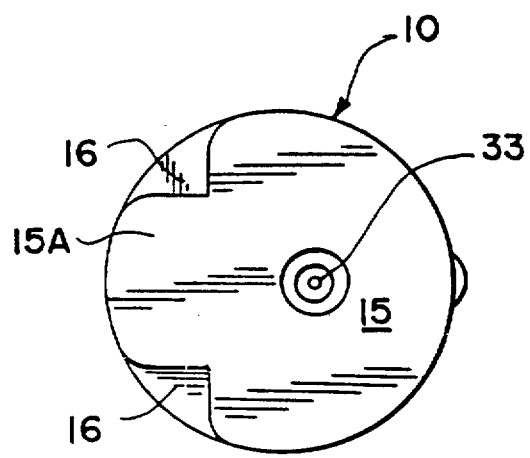

It is certified that error appears in the above—identified patent and that said Letters Patent is hereby corrected as shown below:

Reference Numerals 10, 15, 15A, 16, 20, 22, 25, 25A, 26 and 33 are added to Figures 3 and 4 on page 3 of the drawings (as per attached sheet).

Signed and Sealed this

Twenty-eighth Day of November 1995

Attest:

BRUCE LEHMAN

Attesting Officer

Commissioner of Patents and Trademarks